A. H. LEIPERT.
GEARING.
APPLICATION FILED DEC. 30, 1919.
1,418,447. Patented June 6, 1922.
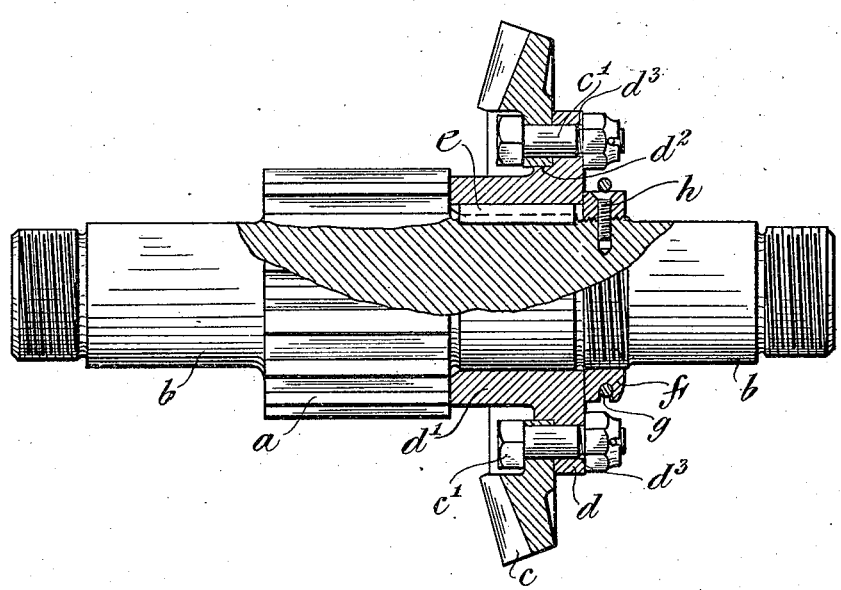
INVENTOR
August H. Leipert
BY
ATTORNEYS

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

GEARING.

1,418,447.  Specification of Letters Patent.  Patented June 6, 1922.

Application filed December 30, 1919. Serial No. 348,448.

*To all whom it may concern:*

Be it known that I, AUGUST H. LEIPERT, a citizen of the United States, residing in the borough of Queens of the city of New York, in the State of New York, have invented certain new and useful Improvements in Gearing, of which the following is a specification, reference being had to the accompanying drawing, forming a part hereof.

This invention is concerned primarily with improved gearing in which, where more than one gear or other part is carried on a shaft, there is a gear integral with the shaft. More particularly, the immediate problem has arisen in double reduction gearing in which two gears are carried on a shaft in close juxtaposition to each other, these gears being of different diameters to afford the desired reduction.

The improvement will appear in greater detail hereinafter in connection with the description given with reference to the illustrated embodiment in the drawing in which the single view shows partly in section and partly in elevation a shaft and double reduction gearing.

The immediate problem has arisen in automobile practise where there is desired a compact construction and relation of parts at the rear end for the purpose of obtaining a double reduction. As shown in the drawing, a spur pinion $a$ is formed integral with the pinion shaft $b$ on which is carried a bevel ring gear $c$ secured by bolts $c'$ to a flange $d$ of its hub $d'$. The elements thus far described in their intended relationship will have the hub $d'$ of the bevel gear $c$ in close juxtaposition to and, usually, in abutment with the spur pinion $a$. The hub $d'$ is shown shrunk on to the shaft $b$, a key $e$ being preferably employed as a supplemental holding element. The inner face of the hub $d'$ may abut against the proximate face of the pinion $a$. As a final safeguard in fixing the hub $d'$ securely on the shaft $b$ a lock nut $f$ may be threaded on to the shaft $b$ against the hub $d'$ and finally locked in place by means of of a lock wire $g$ encircling the nut and sprung over a grooved stud $h$ which passes through the nut into the shaft. With the hub $d'$ thus securely affixed to the shaft $b$ there may be attached thereto the ring gear $c$ or other part. The simplest means for facilitating the attachment of the gear $c$ to the hub $d'$ is illustrated, wherein the hub $d'$ is provided with a cylindrical flange $d$ shouldered, as at $d^2$, to afford a substantial bearing surface for the inner periphery of the ring gear $c$. The flange $d$ may have suitable bolt holes $d^3$ drilled and reamed therein after the hub $d'$ is affixed to the shaft $b$ and through these bolt holes will pass the locking bolts $c'$ whereby the gear $c$ is held to the flange. It will be observed that the inner diameter of the ring gear $c$ is such as to permit it to be passed over the spur pinion $a$ in assembling and disassembling.

The improved gearing is defined in the accompanying claim in language which will indicate the scope of the invention.

I claim as my invention:

In combination with a shaft, a pinion integral therewith, a flanged hub in juxtaposition to the pinion supported on the shaft and keyed thereto, said flange being formed with a shoulder on its inner face, and a ring gear having a greater internal diameter than the diameter of the pinion and a lesser internal diameter that the diameter of the flange and resting on said shoulder and bolted to said flange.

This specification signed this 26th day of December A. D. 1919.

AUGUST H. LEIPERT.